United States Patent
Chen

(10) Patent No.: US 9,694,633 B2
(45) Date of Patent: Jul. 4, 2017

(54) MOVABLE TIRE INFLATION APPARATUS

(71) Applicant: Greencell Industries Co., Ltd., New Taipei (TW)

(72) Inventor: Shengti Chen, New Taipei (TW)

(73) Assignee: Greencell Industries Co., Ltd., New Taipei (TW)

( * ) Notice: Subject to any disclaimer, the term of this patent is extended or adjusted under 35 U.S.C. 154(b) by 196 days.

(21) Appl. No.: 14/799,318

(22) Filed: Jul. 14, 2015

(65) Prior Publication Data

US 2016/0280020 A1    Sep. 29, 2016

(30) Foreign Application Priority Data

Mar. 26, 2015 (TW) .............................. 104204569 U

(51) Int. Cl.
| | |
|---|---|
| *B60C 23/10* | (2006.01) |
| *B60C 23/00* | (2006.01) |
| *B60C 23/04* | (2006.01) |

(52) U.S. Cl.
CPC ............ *B60C 23/10* (2013.01); *B60C 23/004* (2013.01); *B60C 23/0491* (2013.01)

(58) Field of Classification Search
CPC ... B60C 23/10; B60C 23/0491; B60C 23/004; B60C 23/0498
USPC ................. 152/415, 417, 418, 419
See application file for complete search history.

(56) References Cited

U.S. PATENT DOCUMENTS

| | | | | |
|---|---|---|---|---|
| 7,225,845 | B2* | 6/2007 | Ellmann ................. | B60C 23/12 152/419 |
| 7,357,164 | B2* | 4/2008 | Loewe .................. | B60C 23/004 152/418 |
| 9,579,936 | B2* | 2/2017 | Brushaber ............. | B60C 23/002 |
| 2012/0234447 | A1* | 9/2012 | Narloch .................. | B60C 23/10 152/418 |

* cited by examiner

*Primary Examiner* — S. Joseph Morano
*Assistant Examiner* — Jean Charleston
(74) *Attorney, Agent, or Firm* — Wang Law Firm, Inc.

(57) ABSTRACT

A movable tire inflation apparatus includes an inflation device and a fixing structure. The inflation device includes a casing defining an accommodation room. The accommodation room is equipped with an inflation component, and an electrical control module which is connected electronically to the inflation component. At least one magnetic positioning member is disposed at one side of the casing. The fixing structure is disposed at an outer side of the inflation device in such a manner to fix the inflation device on an outer side of a wheel and the magnetic positioning member is magnetically positioned at one side of the wheel. In this way, the movable tire inflation apparatus is fixed on the outer side of the wheel and connected to the wheel by the inflation device, to inflate a tire as the wheel is moving, providing advantages in easy carriage, repair convenience and safety improvement.

8 Claims, 7 Drawing Sheets

MOVABLE TIRE INFLATION APPARATUS

CROSS-REFERENCE TO RELATED APPLICATION

This application claims the priority of Taiwanese patent application No. 104204569, filed on Mar. 26, 2015, which is incorporated herewith by reference.

BACKGROUND OF THE INVENTION

1. Field of the Invention

The present invention relates to an inflation apparatus, particularly to an inflation apparatus which is adapted to be installed on a wheel of a vehicle such that the tire of the wheel can be inflated if required while the vehicle is moving.

2. The Prior Arts

Traveling on rough land or long-distance usually increases the damage to vehicle tires. Especially when driving through a deserted area, the wheel may encounter several problems, such as tire leakage or flat tire. It is relatively difficult to find a suitable place to repair the tires and it is unlikely for the drivers to have a vehicle-mounted inflation apparatus onboard all the time, which is generally large in size. FIGS. 1 and 2 respectively are cross-sectional views of a conventional tire explosion prevention device 1 mounted on a vehicle wheel. A tire 2 is mounted on a wheel rim 4 of the vehicle wheel, which includes a wheel rim 4, a tire 2 sleeved around the wheel rim 4, and a filling device 5. When the tire 2 is punctured or flattened, a filling material 6 is sprayed out of the filling device 5 to fill the tire 2 so as to strengthen the entire structure and safety of the vehicle wheel.

However, the conventional tire explosion prevention device 1 has several disadvantages. First, an explosion prevention material must be placed in the wheel in advance, which increases the weight of the wheel and affects the ordinary traveling. In case the tire of a moving vehicle blows out during the driving, repairing cannot be conducted immediately, hence the effects are not good in practice. Second, even if the vehicle with blowout tire can be driven to a repairing center to remove the wheel, the filling material 6, which is a chemical material, is adhered securely to the tire 2 and the wheel rim 4, resulting in relatively difficult to clean them. Furthermore, the damage on the tire 2 may not be repairable for further use.

In addition, a vehicle-mounted inflation apparatus requires a power equipment and a gas tank, which occupy a larger space and weight, resulting in high cost and inconvenience for practical use.

Due to above-mentioned disadvantages, the inventor of the present application believes that there is an urgent need to improve the conventional tire explosion prevention device and the vehicle-mounted inflation apparatus, hence leading to the present invention.

SUMMARY OF THE INVENTION

A primary objective of the present invention is to provide a movable tire inflation apparatus for urgently maintaining a damaged tire, and allowing continuous traveling of the vehicle until reaching a repairing center for the repair.

A movable tire inflation apparatus of the present application accordingly includes an inflation device and a fixing structure. The inflation device includes a casing defining an accommodation room, an inflation component and an electrical control module disposed in the accommodation room, wherein the inflation component is equipped with a pressure senor and the electrical control module is connected electrically to the inflation component, and at least one magnetic positioning member disposed at one side of the casing. The fixing structure is juxtaposed to the inflation device in such a manner to fix the inflation device securely on an outer side of a wheel while the magnetic positioning member is magnetically positioned at one side of the wheel, thereby fixing the inflation device on the wheel; wherein, the movable tire inflation apparatus is fixed securely on the outer side of the wheel via the inflation device in order to inflate the tire while the wheel is moving.

Preferably, the fixing structure further includes a fixing ring and a plurality of limit parts which are respectively connected to the fixing ring and a fixing girdle connected to a corresponding one of the limit parts so as to be fixed on the wheel.

Preferably, the casing further includes a first cover and a second cover coupled relative to each other while the magnetic positioning member is disposed on one side of the second cover.

Preferably, a waterproof layer is disposed between the fixing structure and the casing of the inflation device.

Preferably, the inflation component includes a cylinder, a driving motor coupled to the cylinder for driving the cylinder and an air duct; one end of the air duct is equipped with a coupling head, which is equipped with the pressure sensor, while the other end of the air duct is connected spatially to the cylinder.

A fixing stand is disposed on one side of the cylinder for connection to the casing, and a cooling fan is disposed on one side of the driving motor.

Preferably, the electrical control module includes a controller, which is electrically connected to a rechargeable battery and the driving motor respectively.

Preferably, the movable inflation apparatus of the present invention further includes a digital meter disposed on one side of the first cover of the casing, a switch and at least a socket. The digital meter, the switch and the socket are electrically connected to the electrical control module and a car charger or a set of alligator clips can be plugged in the socket.

Preferably, the magnetic positioning member includes a fastening piece and a silicone barrel. The fastening piece has a cylindrical shape corresponding to the silicone barrel. One end of the fastening piece is recessed with a limit hole, in which a spring and a magnet are sequentially placed therein, and the fastening piece is connected to the silicone barrel. Furthermore, two guiding slots are formed on the peripheral wall of the fastening piece along the axial direction. The silicone barrel has an outer peripheral wall formed with two limit columns corresponding to and extending slidably into the guiding slots.

Regarding the movable inflation apparatus of the present application, the inflation device is fixed on the outer side of the wheel and hence connecting to the wheel, and the combination of the inflation device and the wheel is stabilized by the fixing structure, thereby allowing the inflation of the tire during the vehicle is traveling. Therefore, the movable tire inflation apparatus of the present invention has the following advantages: easy to be carried along with the vehicle onboard to facilitate the repairing effectively with convenience.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
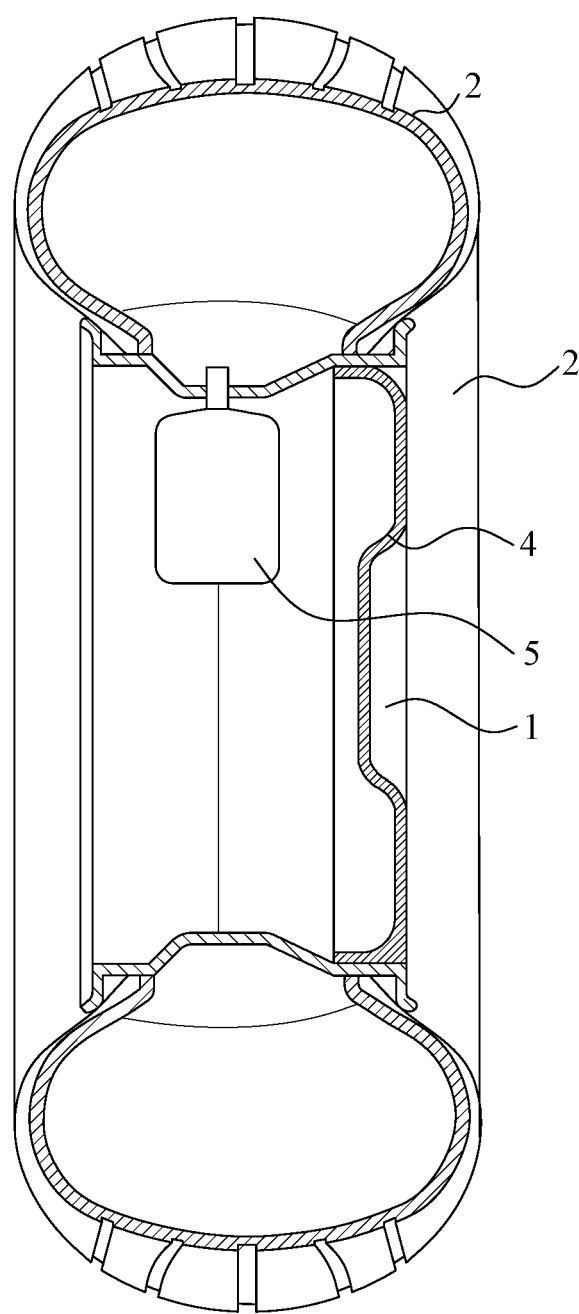
FIG. 1 is a cross-sectional view illustrating a conventional tire explosion prevention device mounted on a vehicle wheel.
Figure 2:
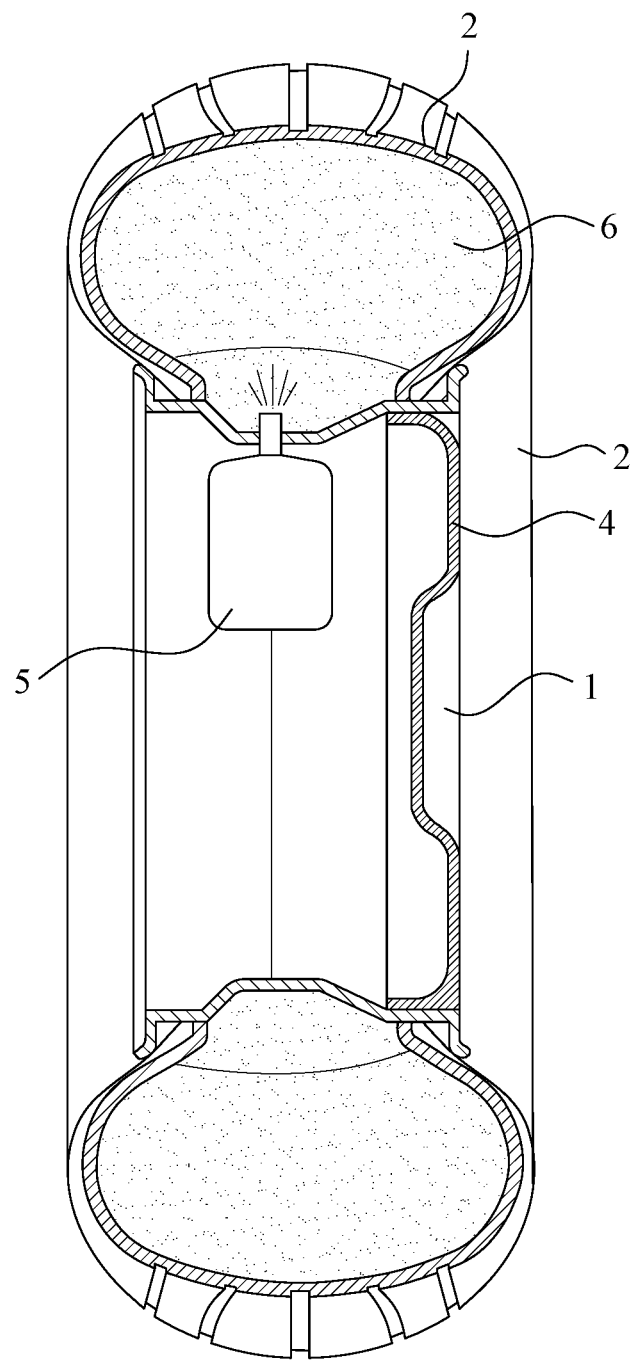
FIG. 2 is a schematic view illustrating the use of the conventional tire explosion prevention device of FIG. 1.
Figure 3:
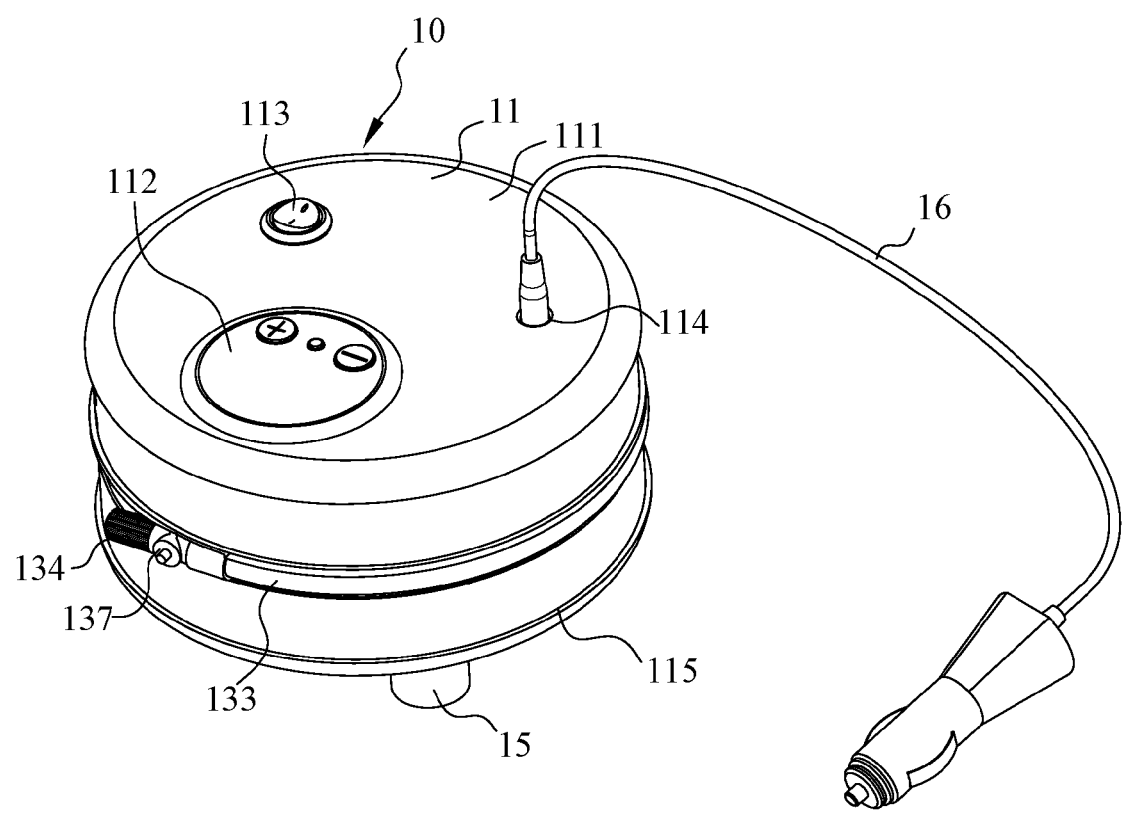
FIG. 3 is a perspective view of an inflation device employed in a movable tire inflation apparatus of the present invention.
Figure 4:
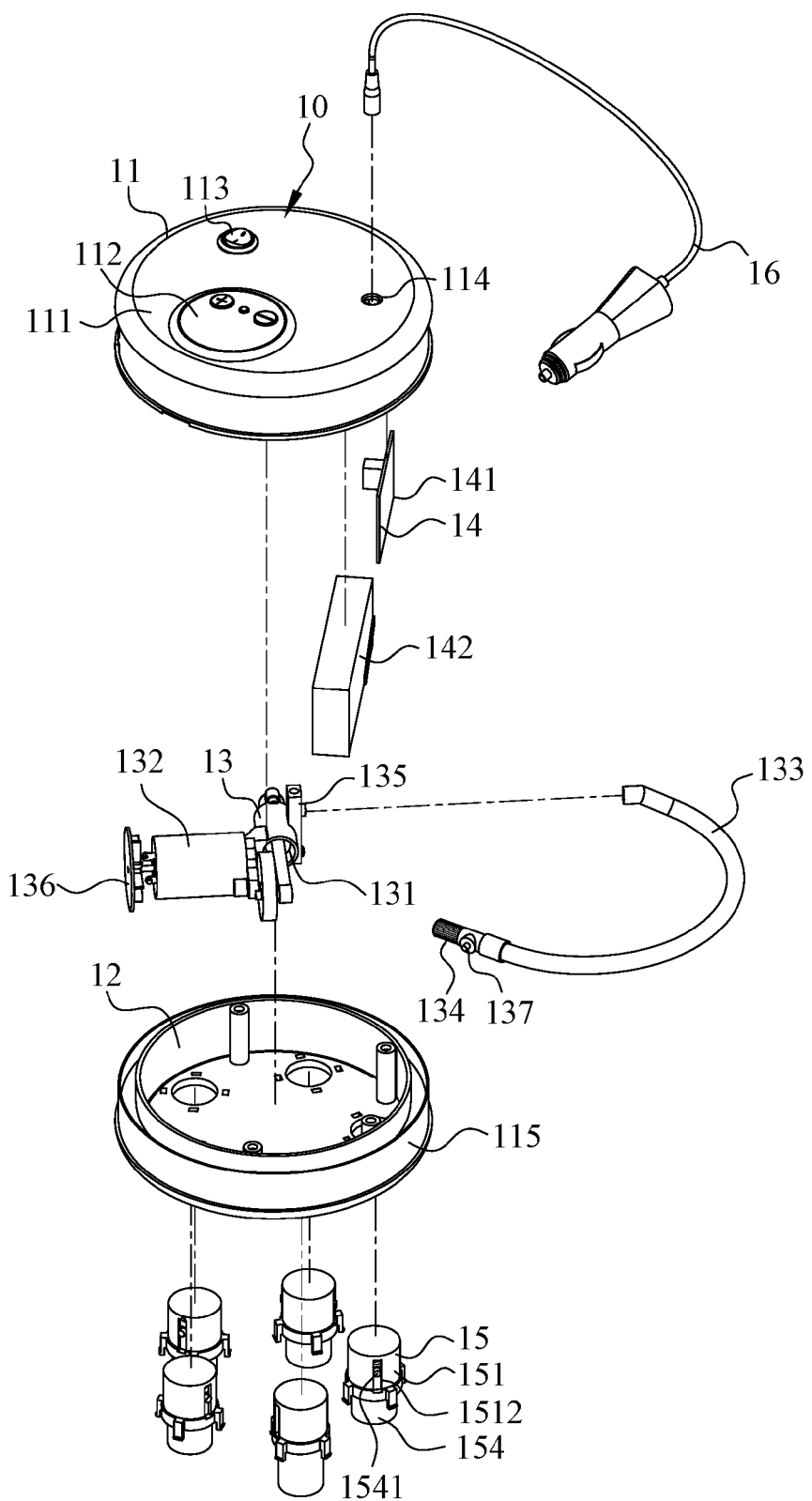
FIG. 4 is an exploded view of the inflation device employed in the movable tire inflation apparatus of the present invention.
Figure 5:
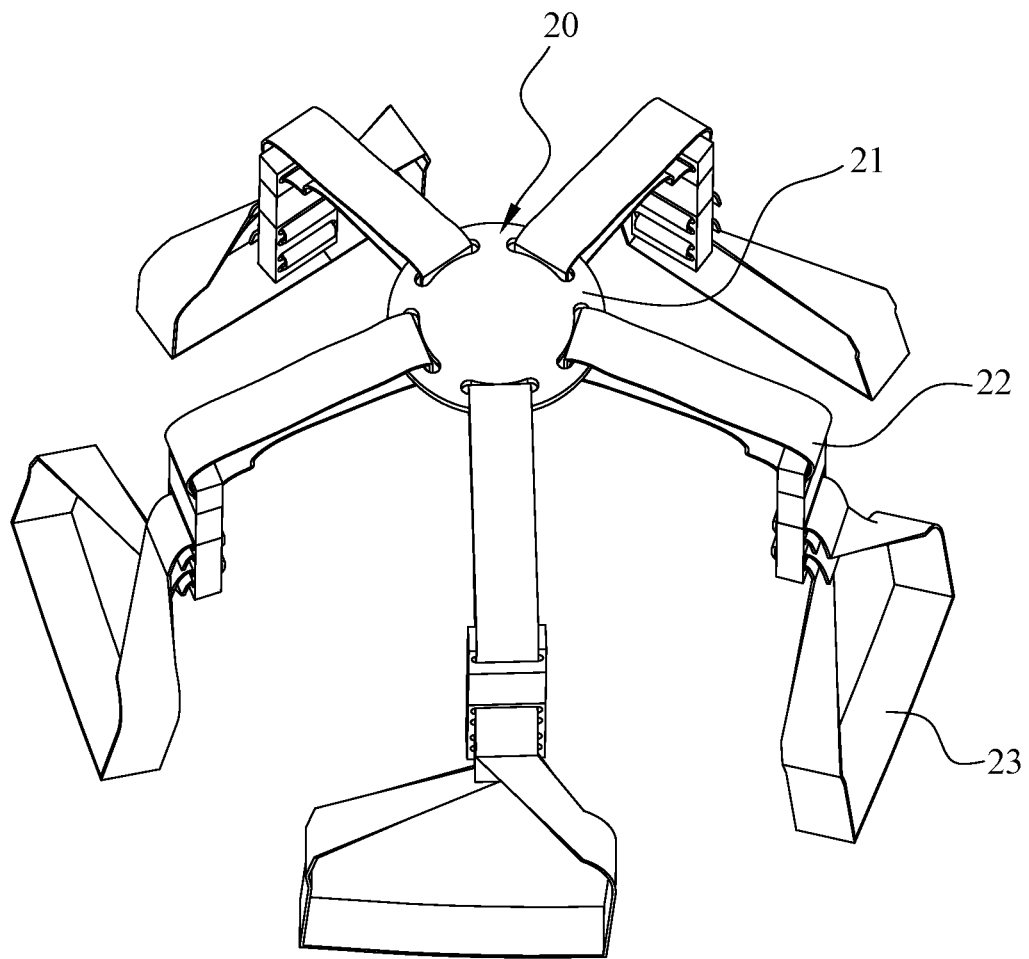
FIG. 5 is a perspective view of a fixing structure employed in the movable tire inflation apparatus of the present invention.

Referring to FIGS. 3-5, FIG. 3 is a perspective view of an inflation device employed in a movable tire inflation apparatus of the present invention; FIG. 4 is an exploded view of the inflation device employed in the movable tire inflation apparatus of the present invention; and FIG. 5 is a perspective view of a fixing structure employed in the movable tire inflation apparatus of the present invention.

As illustrated, the movable tire inflation apparatus of the present invention includes an inflation device 10 and a fixing structure 20.

The inflation device 10 includes a casing 11 defining an accommodation room 12, wherein an inflation component 13 and an electrical control module 14 are disposed in the accommodation room 12. The electrical control module 14 is electrically connected with the inflation component 13. In addition, the casing 11 includes a first cover 111 and a second cover 115. The first cover 111 and the second cover 115 are coupled relative to each other, and a magnetic positioning member 15 is disposed on one side of the second cover 115. In the embodiment, the inflation component 13 includes a cylinder 131, a driving motor 132, an air duct 133 and a pressure sensor 137; one end of the air duct 133 is provided with a coupling head 134, which, in turn, is equipped with a pressure sensor 137, while the other end of the air duct 133 is connected spatially with the cylinder 131. The cylinder 131 is attached to the driving motor 132 and a fixing stand 135 is disposed on one side of the cylinder 131. The fixing stand 135 is further connected to the casing 11. A cooling fan 136 is disposed on one side of the driving motor 132. Furthermore, the electrical control module 14 includes a controller 141, which is electrically connected to a rechargeable battery 142 and the driving motor 132 respectively. The interior of the controller 141 is provided with a sensor system to prevent over-inflation. The controller 141 is connected with the pressure sensor 137 through signal communication to prevent the inflation component 13 from over-inflating. The tire inflation apparatus of the present invention further includes a digital meter 112 disposed on one side of the first cover 111 of the casing 11, a switch 113 and at least one socket 114. The digital meter 112, the switch 113 and the socket 114 are electrically connected to the electrical control module 14 such that a car charging unit 16 or a set of alligator clips can be plugged into the socket 114.

Figure 6:
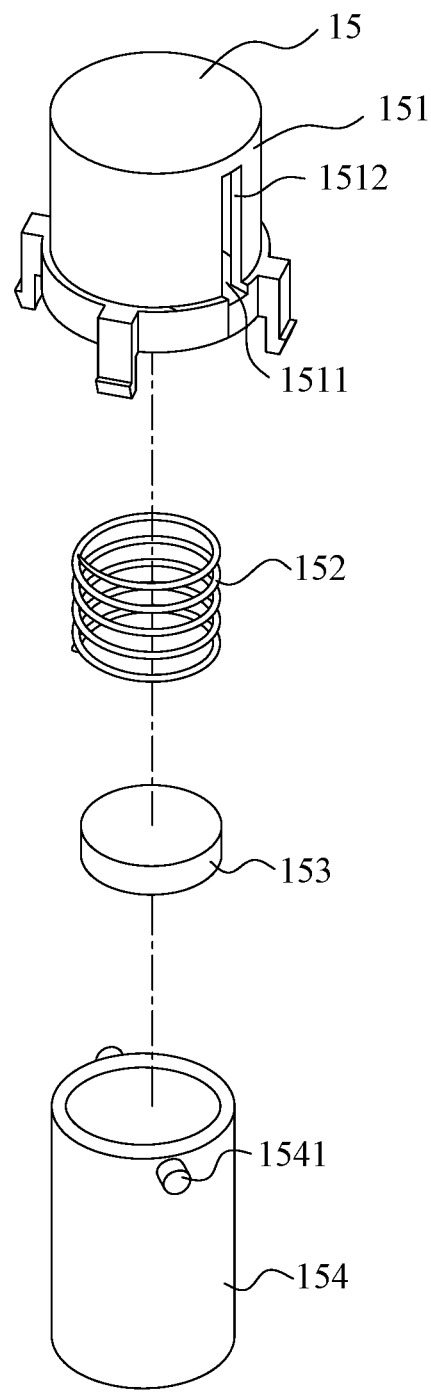
FIG. 6 is an exploded view of the magnetic positioning member employed in the movable tire inflation apparatus of the present invention.

FIG. 6 is an exploded view of the magnetic positioning member employed in the movable tire inflation apparatus of the present invention. As shown, the magnetic positioning member 15 includes a fastening piece 151 and a silicone barrel 154. The fastening piece 151 corresponds to the silicone barrel 154 and has a cylindrical shape. The lower end of the fastening piece 151 is recessed with a limit hole 1511. In the limit hole 1511 of the fastening piece 151, a spring 152 and a magnet 153 are sequentially placed. The silicone barrel 154 is inserted partially into the fastening piece 151. Furthermore, the peripheral wall of the fastening piece 151 is formed with two guiding slots 1512 along the axial direction. The outer peripheral wall of the silicone barrel 154 is formed with two limit columns 1541 which correspond and extend slidably into the guiding slots 1512.

The fixing structure 20 includes a fixing ring 21, a plurality of limit parts 22 respectively connected to the fixing ring 21 and a fixing girdle 23 connected to a corresponding ones of the limit parts 22 in order to be fixed on the wheel 40. In the embodiment, the fixing structure 20 is juxtaposed to the inflation device 10 in such a manner to fix the inflation device 10 on the outer side of the wheel 40 while the magnetic positioning member 15 is magnetically positioned on one side of the wheel 40.

Figure 7:
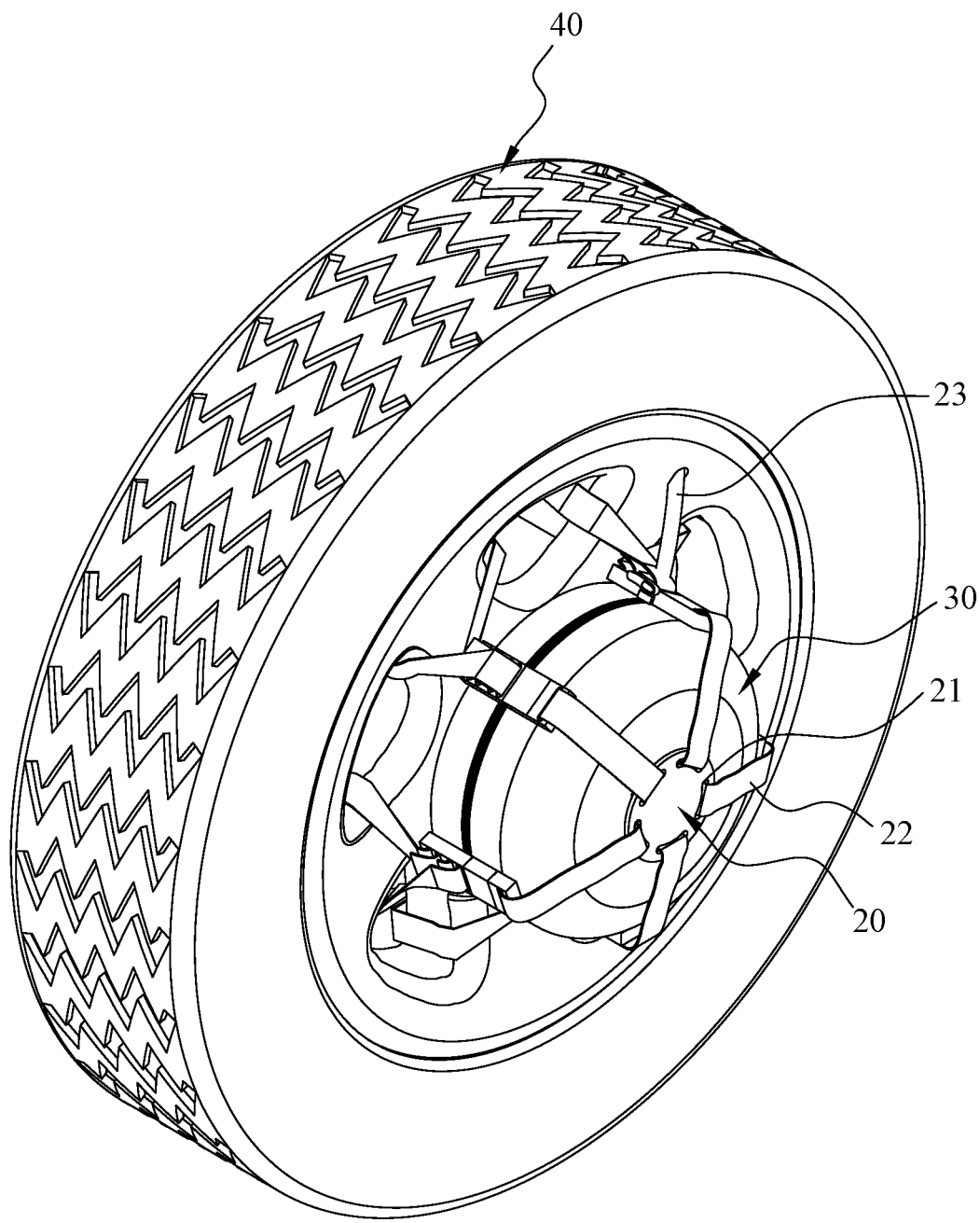
FIG. 7 is a schematic view illustrating application of the movable tire inflation apparatus of the present invention.

FIG. 7 is a schematic view illustrating application of the movable tire inflation apparatus of the present invention. As shown, a waterproof layer 30 is disposed between the fixing structure 20 and the casing 11 of the inflation device 10. The waterproof layer 30 is made from a waterproof fabric.

For further understanding the structure features, technical means, and expect result of the present invention, the application of the present application is described in details as below:

Referring again to FIGS. 3, 5 and 7, which are perspective and schematic views illustrating the application of the tire inflation apparatus of the present invention. In case the tire of a wheel 40 is damaged as the vehicle travels on a deserted land or on a long-distance. At this time, the driver can then align the second cover 115 of the inflation device 10 to the outer side of the wheel 40 and attach the inflation device 10 on the wheel 40, meanwhile, the magnetic positioning member 15 is magnetically attached to the rim of the wheel 40 so that the inflation device 10 can be positioned on one side of the wheel 40. Then, the driver can draw out the air duct 133, lets the coupling head 134 connect with the air valve of the wheel 40 and the switch 113 is switched on to allow the inflation component 13 to continuously inflate the tire of the wheel 40, and then covers the outer side of the inflation device 10 with the waterproof layer 30, and finally, fixes the fixing structure 20 on the outer side of the inflation device 10 and fixes the fixing girdles 23 on the rim of the wheel 40, thereby fixing the tire inflation apparatus of the present invention again on the wheel 40.

It is to note that referring to FIG. 7, since the outer side of the inflation device 10 can be covered with a waterproof layer 30, water and mud would not be in contact with the inflation device 10 when the vehicle passes through ponds or puddles, preventing the inflation device 10 from being damage. The waterproof layer 30 provides a better waterproofing and protecting function to the tire inflation apparatus of the present invention.

It is to note that when the support rim of the wheel 40 is in a shape with a plurality of claws, the fixing structure 20 is equipped with a plurality of limit parts 22; therefore, the tire inflation apparatus of the present invention can be fixed on variety types of wheels 40. In addition, in case of the battery runs out, the driver can charge the battery by connecting the alligator clips to the battery and inflation device 10 respectively. Furthermore, if the rechargeable battery 142 is low in power, the car charging unit 16 can be plugged to the socket on the vehicle to charge the rechargeable battery 142. The present invention therefore has a better practicability.

Therefore, the present invention is characterized by the following advantages:

In the movable tire inflation apparatus of the present invention, the inflation device 10 can be fixed on the outer side of the wheel 40, thereby connecting to the wheel 40, and the combination of the inflation device 10 and the wheel 40 is stabilized by the fixing structure 20, allowing inflation of air into the tire of the wheel 40 for traveling on the road. The controller 141 is connected with the pressure sensor 137 through signal communication to prevent the inflation component 13 from over-inflating the tire of the wheel 40. Thus, the movable tire inflation apparatus of the present invention is convenient to be carried along in addition to providing on-spot repairing of the tire with safety.

In conclusion, the present invention has improvement and practicability compared to similar products. And no similar structures have been found in the prior art. Therefore, the present invention meets the patentability requirements.

However, the description above is only one preferred embodiment of the present invention, and any equivalent modification as specified in the specification and claims is considered as under the scope of the present invention.

What is claimed is:

1. A movable tire inflation apparatus comprising:
    an inflation device including:
        a casing defining an accommodation room,
        an inflation component and an electrical control module disposed in the accommodation room, wherein the inflation component is equipped with a pressure sensor and the electrical control module is connected electrically to the inflation component, and
        at least one magnetic positioning member disposed at one side of the casing; and
    a fixing structure juxtaposed to the inflation device in such a manner to fix the inflation device securely on an outer side of a wheel while the magnetic positioning member is magnetically positioned at one side of the wheel, thereby fixing the inflation device on the wheel;
    wherein the movable tire inflation apparatus is fixed securely on the outer side of the wheel via the fixing structure in order to inflate a tire while the wheel is moving.

2. The movable tire inflation apparatus according to claim 1, wherein the fixing structure further includes a fixing ring, a plurality of limit parts respectively connected to the fixing ring, and a fixing girdle connected to a corresponding one of the limit parts in order to be fixed on the wheel.

3. The movable tire inflation apparatus according to claim 1, wherein the casing includes a first cover and a second cover coupled relative to each other; and the magnetic positioning member is disposed on one side of the second cover.

4. The movable tire inflation apparatus according to claim 1, wherein a waterproof layer is disposed between the fixing structure and the casing of the inflation device.

5. The movable tire inflation apparatus according to claim 1, wherein the inflation component includes a cylinder, a driving motor attached to the cylinder, and an air duct; one end of the air duct is equipped with a coupling head, which is equipped with the pressure sensor while the other end of the air duct is connected spatially with the cylinder, wherein a fixing stand is disposed at one side of the cylinder for connection to the casing, and a cooling fan is further disposed one side of the driving motor.

6. The movable tire inflation apparatus according to claim 5, wherein the electrical control module includes a controller electrically connected to a rechargeable battery and the driving motor respectively.

7. The movable tire inflation apparatus according to claim 6, further comprising a digital meter disposed on one side of the casing and electrically connected with the electrical control module, a switch and at least a socket electrically connected with the electrical control module in such a manner that a charger unit or an alligator clip can be plugged into the socket.

8. The movable tire inflation apparatus according to claim 1, wherein the magnetic positioning member includes a fastening piece having a cylindrical shape and a silicone barrel corresponding to the cylindrical shape and inserted partially into the fastening piece; one end of the fastening piece is recessed with a limit hole in which a spring and a magnet are sequentially placed, and two guiding slots are further formed at an outer peripheral wall of the fastening piece along the axial direction; the silicone barrel having an outer peripheral wall provided with two limit columns slidably extending into the guiding slots.

* * * * *